March 30, 1937.　　　G. W. COLON　　　2,075,021
FASTENER FOR TYPEWRITERS
Filed May 7, 1935
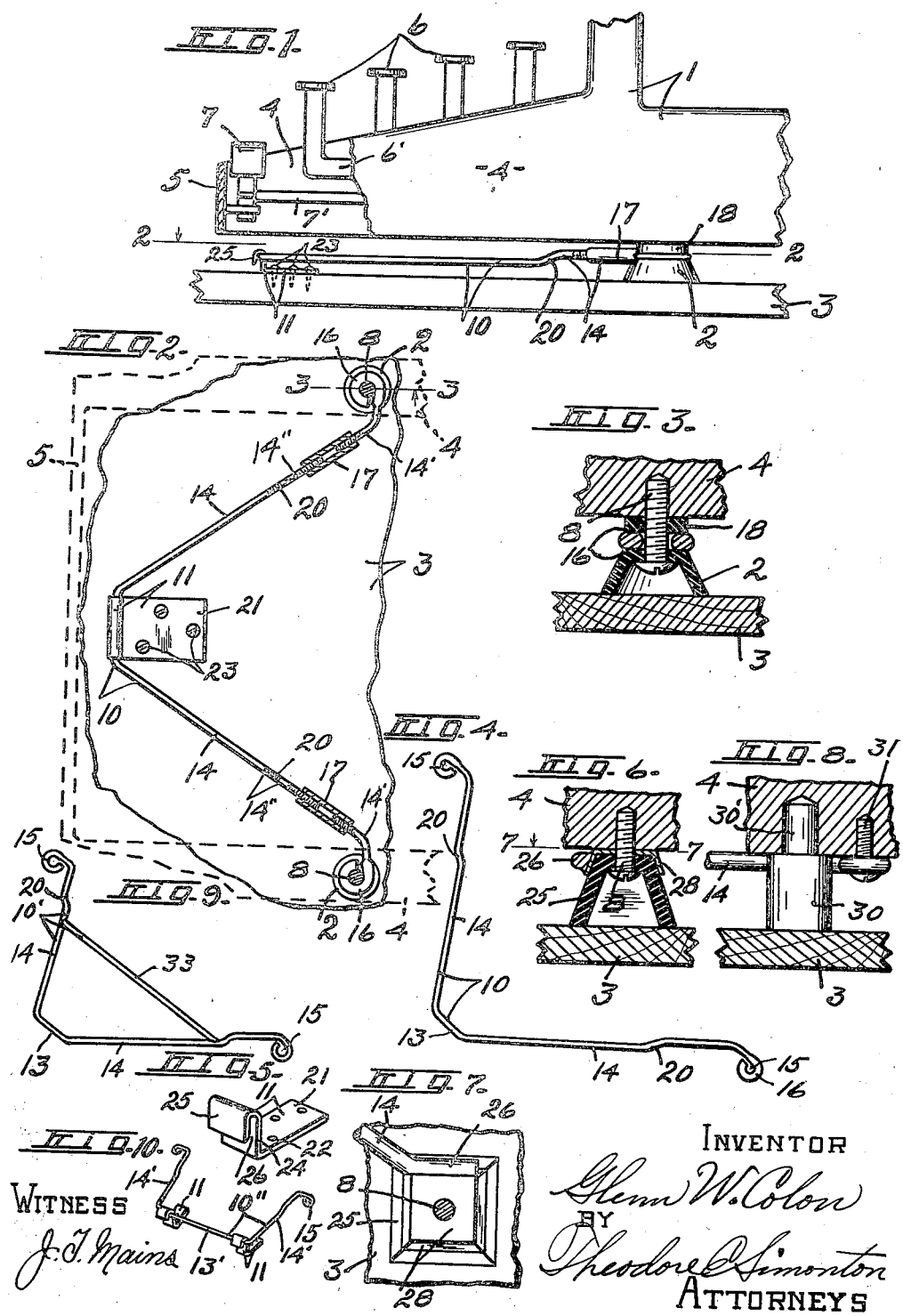

Patented Mar. 30, 1937

2,075,021

UNITED STATES PATENT OFFICE 2,075,021

FASTENER FOR TYPEWRITERS

Glenn W. Colon, Syracuse, N. Y., assignor to L. C. Smith & Corona Typewriters, Inc., Syracuse, N. Y., a corporation of New York Application May 7, 1935, Serial No. 20,222

8 Claims. (Cl. 248—25)

This invention relates to a fastener for detachably securing a typewriter or the like to a support and particularly to a tiltable support or base such as is provided in the usual folding or closing typewriter desk.

It is a well known fact that in devices such as typewriters having a multiplicity of delicately constructed relatively movable parts operably mounted in a supporting frame of relatively light construction, it is necessary that the frame remain or be maintained in a free natural unsprung condition or position at all times during the operation of the device in order to obtain the maximum efficiency and life of the machine.

The primary object of this invention is to provide a fastening means for removably securing a typewriter or the like to a support whereby the machine will be maintained in a predetermined position on the base or support in a normal unsprung condition so that the relatively movable parts thereof may freely function without binding and excessive friction or stress and the machine will be free to vibrate in the normal manner during the operation thereof.

Another object of the invention is to provide a fastening means for securing a typewriter or the like to the supporting member of a typewriter desk in such a manner that the machine will be prevented from falling from the support into the desk when tilting the support to close the desk and conceal the typewriter and at the same time permit the machine to be quickly and easily detached from or attached to the support to permit cleaning, repairing, interchanging or the moving of the machine to a remote place.

Another object of the invention is to provide a fastening means for typewriters which is readily applicable to various makes and types of machines.

A further object of the invention resides in providing a device of the class described which is simple durable and economical in construction and which comprises a pair of interlocking members, one of which may be readily and permanently secured to the typewriter while the other member may be permanently secured to a desk top or other support without requiring an expert mechanic and without material alteration in the machine structure or the mutilation to any appreciable extent of the support.

Other objects and advantages pertaining to the details of the structure and to the application thereof will more fully appear from the following description taken in connection with the accompanying drawing in which:

Figure 1 is a fragmentary side elevation, partly in section, of a typewriter machine and support therefor with my novel fastening device associated therewith;

Figure 2 is a horizontal sectional view taken on the line 2—2, Figure 1, illustrating the adjacent portion of the typewriter frame by broken lines;

Figure 3 is an enlarged vertical sectional view taken substantially in the plane of the line 3—3, Figure 2, and illustrating one method of securing the fastening means to the frame of a typewriter by the utilization of the foot or supporting member and the clamping screw therefor;

Figure 4 is a perspective view illustrating a slightly modified form of the fastener strap shown in Figures 1 and 2;

Figure 5 is a perspective view of the clamp;

Figure 6 is a vertical sectional view similar to Figure 3 illustrating a modified form of typewriter foot and the manner of securing the fastener strap in position;

Figure 7 is a horizontal sectional view taken on the line 7—7, Figure 6;

Figure 8 is a vertical sectional view illustrating still another form of typewriter supporting member and manner of securing my novel fastening means to the frame;

Figure 9 is a perspective view of a modified form of the strap shown in Figure 2; and Figure 10 is a still further modification of my fastener strap and means of releasably securing the same to a base or support.

In Figure 1 of the drawing I have illustrated a portion of a conventionally constructed typewriter comprising a frame 1 provided with resilient feet 2, preferably composed of rubber, for supporting the same upon a base or table top 3. The frame 1 comprises longitudinally extending side members 4 and a front end or cross member 5 which ties the side members together.

The typewriter is shown as having the usual banks of keys 6 and a spacer bar 7 arranged adjacent the front cross member 5 of the frame in a plane between said cross member and the keys 6. It is to be understood that while I have shown only two feet for the frame 1, said frame may be provided with any desired number of such feet and each foot, as illustrated in Figures 1, 2, and 3, is a frusto-conical member composed of rubber or other resilient material and is secured to the side members of the frame by clamping screw 8 which extends upwardly through a central aperture provided in the foot.

My novel fastener, as illustrated in the drawing, consists primarily of two members, namely, a strap 10 and a clip 11. The strap 10 is a resilient member preferably formed from a single piece of wire as shown in Figure 4 composed of steel, brass or other suitable material. The strap is a substantially V-shaped member formed by bending an intermediate portion of the wire to form a transverse portion 13 of considerably less length than the width of the typewriter frame 1 and two resilient arms 14 of equal length and which extend outwardly from respective ends of the transverse portion and at one side thereof in diverging planes.

The outer ends of the arms are bent outwardly in a direction away from each other and are then looped to form an eyelet 15 adapted to receive a clamping screw or bolt as 8 therethrough. The looped portion of each end of the strap is preferably flattened at opposite sides thereof as at 16 so as to provide a relatively broad surface for contact with adjacent surfaces of cooperating members for maintaining the bracket in a predetermined position relative to the frame 1, said eyelets being spaced apart a distance substantially equal to the transverse spacing of the corresponding feet 2.

When the structure of the machine permits, I preferably, as shown in Figures 1, 2, and 3, utilize the foot or pad members 2 positioned adjacent the keys 6 for securing the strap 10 to the frame 1 of the typewriter. When the strap is secured to the frame in this manner, the two forwardly positioned feet 2 of the machine are removed from the frame. The loop ends of the strap are then placed between a respective foot and the frame and secured in place by the clamping screw 8 for the foot which is extended through the eyelet 15 of the corresponding arm of the strap, as shown in Figure 3.

The ends of the arms may be positioned directly in contact with the frame, or as shown in Figure 3, a bushing 18, preferably composed of resilient material such as rubber, leather or the like, is positioned between the arm ends and the frame, and the screw 8 is tightly screw-threaded into the frame to securely and firmly fasten the foot, strap, bushing and frame to each other.

When the strap 10 is thus secured to the frame 1, the arms 14 of the strap extend outwardly in substantially parallel relation to the lower face of the frame and, therefore, to the support 3. In order that the strap will be maintained in a plane beneath the adjacent relatively movable parts of the machine, as the key arms or levers 6' and the arms 7' of the spacer bar 7, to permit the free action of these members, each arm 14 of the strap is provided with an offset portion 20 spaced a short distance from the outer end thereof. This offset 20 also functions to normally maintain the transverse portion 13 of the strap and the adjacent portions of the arms 14 in spaced substantially parallel relation to the plane of the other or outer end portions of the arms so that when the strap is in the operative position in engagement with the clip 11, as shown in Figure 1, the frame 1 will be supported naturally by the feet 2 as will presently more clearly appear. The length of the arms 14 is such that when secured to the frame 1, the transverse portion 13 of the strap will lie inside the frame 1 in slightly spaced relation to the forward cross member 5 and substantially midway between the side members 4, as illustrated in Figures 1 and 2.

However, the arms 14 may, if desired, and as shown more clearly in Figure 2, each be formed of two sections as 14' and 14" having their adjacent end portions provided respectively with right and left external screw threads and joined together by a turnbuckle coupling 17. This latter structure obviously permits the over-all length of the arms 14 to be shortened or lengthened as desired within limits so that the strap is thus equally applicable to different machines wherein the distance from the feet 2 to the end 5 of the frame varies. This is due to the fact that the transverse portion 13 of the strap may be uniformly positioned relative to the space bar 7 and keys 6 of the different machines.

The strap 10 is releasably secured to the support 3 by the clip 11 which, in this instance, comprises a base plate 21 having a plurality of, in this instance, three holes 22 for the reception of a like number of screws 23 by which the clip is secured to the support 3. One end of the plate 21 is provided with an upwardly projecting vertical extension 24 which has the outer portion thereof return bent to form a hook 25 which is of less vertical height than the extension 24 and is spaced from the lower face of the plate 21 a distance substantially equal to or slightly greater than the diameter of the transverse portion 13 of the strap 10 so that said transverse portion may be readily passed between the member 25 and the support 3 when bringing the strap into or out of operative relation with the clip 11.

The width of the hook slot as 26 is also substantially equal to the diameter of the transverse portion 13 of the strap 10, while the width of the hook 25 is substantially equal to the length of said transverse portion of the strap so that when the strap is in operative engagement with the clip, the strap and, therefore, the typewriter frame 1 will be firmly maintained against lateral movement by the clip.

The vertical length of the offset portion 20 of the arms 14 and the height of the clip portion 24 are so related that when the strap 10 is secured at one end to the typewriter frame 1 and has the transverse portion thereof in engagement with the clip 11, said transverse portion will be maintained by a relatively slight tension of the arms 14 in engagement with the upper end of the hook slot 26 so that the typewriter will be maintained by the clip and strap against longitudinal movement upon the support 3.

It will, therefore, be understood that the typewriter, while being securely maintained in a predetermined position upon the support against longitudinal and lateral movement relative thereto, is not tightly clamped to the support by the fastening means but is permitted to be supported naturally thereon by the resilient feet 2 so that the freedom of action of the machine during operation is not impaired in any way by the fastening means. Furthermore, it will be understood that the typewriter may be readily secured to the support 3 in a predetermined position after the clip 11 has been connected to the support by merely flexing the arms 14 downwardly to bring the transverse portion of the strap beneath the lower edge of the clip member 25 and then moving the typewriter frame and strap 10 longitudinally of the support to bring the transverse portion into or out of registration with the slot 26 of the clip.

This flexing of the strap arms is readily accomplished by the aid of an instrument, such as a lead pencil, paper knife or the like, which may be brought into contact with the strap 10 by inserting the same between the bank of keys 6 and the spacer bar 7.

In Figures 6 and 7 I have illustrated the strap 10 as being provided with a modified form of means for securing the strap to a typewriter frame having a modified form of feet structure. In the structure illustrated in these two views, the feet as 25 instead of being circular in plan view are substantially rectangular while the ends 26 of the arms 14 of the strap are bent to extend longitudinally of the frame at substantially right angles to the plane of the transverse portion 13. The outer longitudinal face of the ends 26 may, as shown more particularly in Figure 7, be flattened and secured by spot welding or other suitable means to one side of a cap 28. The cap 28 is of an inverted cup-shaped formation substantially rectangular in plan view for reception of the upper end of a foot member 25.

The center of the cap 28 is provided with an aperture for the reception of the clamping screw 8 utilized for securing the foot 25 to the frame. In this structure it will be noted that when the cap is mounted between the foot 25 and the frame in the manner illustrated in Figure 6 that the cap is clamped directly in contact with the frame so that there will be substantially no flexing of the cap or adjacent end of the strap arms 14 during the engaging or disengaging of the strap with the clamp 11.

In Figure 8 I have shown a still further modified manner of securing the fastening strap 10 to the frame. In the structure indicated in this view, the foot as 30 is a cylindrical member having a reduced end portion 30' which is inserted in a suitable socket in the frame 1 and which is maintained therein by friction, glue or other suitable means. Where the machine is provided with this type of feet I preferably use a fastener strap similar to that illustrated in Figures 1, 2, and 4 and secure the strap to the frame by a clamping screw or bolt 31 which extends through the eyelets 15 of the strap and is screw-threaded in the frame of the machine in close proximity to and at the rear of a corresponding foot 30.

In Figure 9 I have shown a slightly modified form of fastener strap. This strap as 10' comprises a V-shaped portion formed in substantially the same manner as the strap 10 and has the arms 14 thereof tied together intermediate their ends by a brace 33.

This brace 33 may, as shown, be composed of spring wire or other suitable material and extends transversely of the arms 14 in substantially parallel relation with the transverse portion 13 and is secured at the ends thereof to the arms in any suitable manner as by spot welding or the like. While the brace 33 is not necessary to the successful operation of my device, its utilization may provide for the forming of the strap from wire having a relatively small diameter.

In Figure 10 of the drawing, I have shown a still further modified form of strap 10''. In this structure the strap is formed in substantially the same manner as that shown and described for the structure shown in Figures 1, 2, and 4 with the exception that the transverse portion as 13' of the strap is of substantially greater length than the transverse portion 13 of the strap 10 while the arms 14' of the strap extend outwardly from the transverse portion in nearer parallel relation than they do in the structure shown in Figures 1, 2, and 4. Furthermore, when employing the strap 10'' I preferably use two clips 11 for releasably securing the strap to the support 3. The two clips 11 are positioned at respective ends of the transverse portion 13' of strap 10'' in close proximity to the respective arms 14' so as to prevent the lateral displacement of the strap and, therefore, the typewriter connected therewith when the strap is in operative engagement with the clips.

Although the construction and operation of my novel fastening means are particularly simple, practical and efficient, I do not wish to be limited to the exact construction shown as it is evident that various changes may be made in the detail construction without departing from the spirit of the invention as set forth in the appended claims.

I claim:

1. A device for releasably securing a typewriter to a support comprising a one-piece member adapted to be permanently secured to opposite sides of the typewriter frame, a clip releasably engaging said member, and means for permanently securing the clip to the support.

2. A device for releasably securing a typewriter to a support comprising a resilient one-piece member adapted to be permanently secured to opposite sides of the typewriter frame, a clip releasably engaging an intermediate portion of the member, and means for permanently securing the clip to the support.

3. A device for releasably securing a typewriter to a support comprising a member having resilient arms adapted to be attached to a typewriter frame arranged in spaced relation to extend longitudinally of the frame from the point of attachment, and a transverse portion connecting the arms together, and means releasably engaging said transverse portion for securing the member to the support.

4. A device for releasably securing a typewriter to a support comprising a member composed of a single piece of spring wire bent to form a transverse portion, and a pair of arms extending outwardly from said transverse portion in spaced relation, the ends of said arms being provided with means for attachment to the frame of a typewriter, and means engaging the transverse portion of the member for releasably connecting the same to the support.

5. A device for releasably securing a typewriter to a support comprising a member composed of a single piece of spring wire bent to form a transverse portion, and a pair of arms extending outwardly from said transverse portion in spaced relation, the ends of said arms being provided with means for attachment to the frame of a typewriter, means engaging the transverse portion of the member for releasably connecting the same to the support, and a brace connecting said arms intermediate the ends thereof.

6. A device for releasably securing a typewriter to a support comprising a member composed of spring wire bent to form a transverse portion and a pair of arms extending outwardly from said transverse portion in spaced relation, the ends of said arms being provided with means for attachment to the frame of a typewriter, and a clip engaging the transverse portion of the member for releasably connecting the same to the support, said clip being substantially equal in width to the length of the transverse portion for maintaining the member against lateral displacement.

7. A device for releasably securing the frame member of a typewriter or the like to the support member comprising a strap having a transverse portion and sectional arms extending outwardly from the transverse portion at one side thereof, said arms being provided at their outer ends with means for attachment to one of said members, means adjustably securing the arm sections together to permit the overall length of the arms to be varied, and means for securing the transverse portion of the strap to the other one of said members.

8. A mounting for a typewriting machine wherein the machine is detachably held to a supporting base by a resilient metal bail which is located at the under side of the front portion of the machine and has a cross-member which extends transversely of the machine and side members which extend rearwardly from said cross-member and are fixedly supported at their rear ends from the frame of the machine to normally sustain the bail spaced above the base, and by upstanding hook means fixedly anchored to the base with the hook means arranged open side down and hooked over the cross-member of the bail between the side members of the bail in a relation with the bail in which the hook means positively blocks movement of the cross-member of the bail relatively to the base both longitudinally and transversely of the machine.

GLENN W. COLON.